April 29, 1930.   J. A. OLDSON   1,756,659
COUNTERBALANCED CRANK SHAFT
Filed July 19, 1928   2 Sheets-Sheet 1
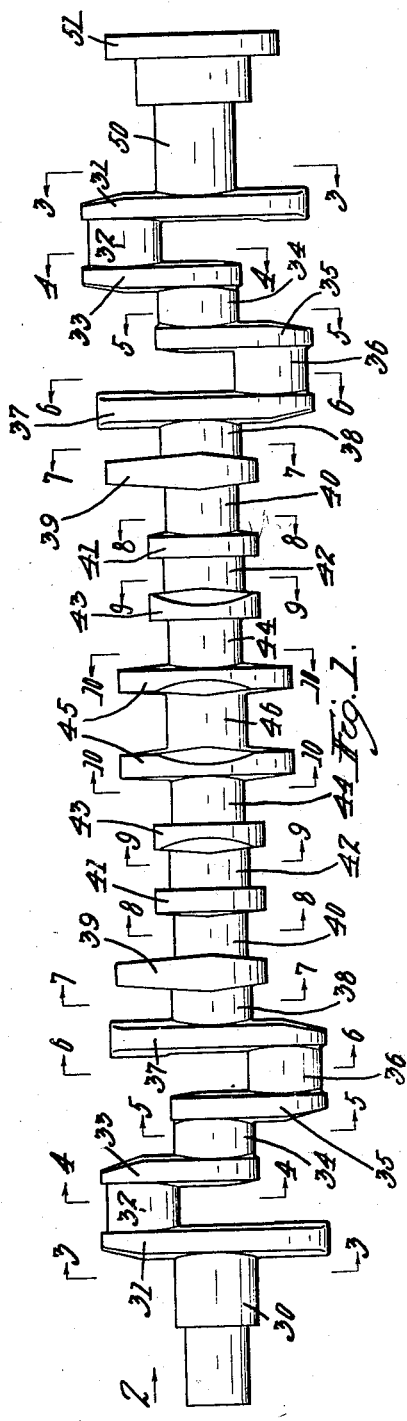
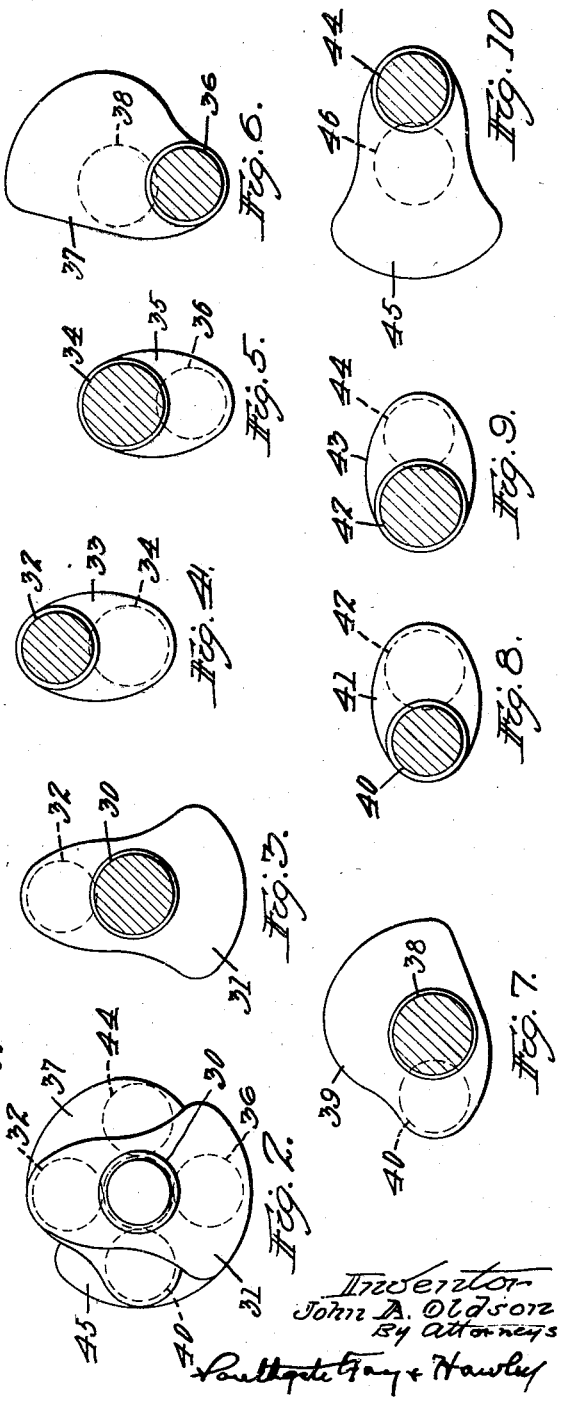

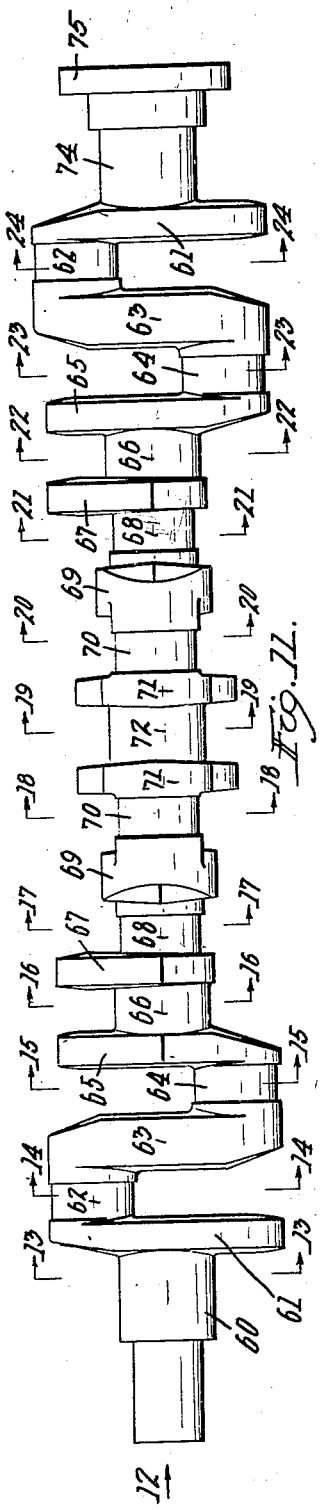
April 29, 1930. J. A. OLDSON 1,756,659
COUNTERBALANCED CRANK SHAFT
Filed July 19, 1928  2 Sheets-Sheet 2
Inventor
John A. Oldson
By Attorneys Patented Apr. 29, 1930

1,756,659

UNITED STATES PATENT OFFICE

JOHN A. OLDSON, OF WORCESTER, MASSACHUSETTS, ASSIGNOR TO WYMAN-GORDON COMPANY, OF WORCESTER, MASSACHUSETTS, A CORPORATION OF MASSACHUSETTS

COUNTERBALANCED CRANK SHAFT

Application filed July 19, 1928. Serial No. 293,916.

This invention relates to a counterbalanced crankshaft of the eight-throw type in which the eight crank pins are disposed in two planes perpendicular to each other.

It is the general object of my invention to provide such a crankshaft with a plurality of counterweights so proportioned and disposed that they will effectively counterbalance the unbalanced forces developed in the operation of the crankshaft.

My invention further relates to arrangements and combinations of parts which will be hereinafter described and more particularly pointed out in the appended claims.

Two applications of the invention are shown in the drawings in which Figs. 1 to 10 inclusive relate to an eight-throw nine-bearing crankshaft and Figs. 11 to 24 inclusive relate to an eight-throw five-bearing crankshaft.

Fig. 1 is a side elevation of an eight-throw nine-bearing crankshaft embodying my improvements;

Fig. 2 is an end elevation thereof looking in the direction of the arrow 2 in Fig. 1;

Figs. 3 to 10 inclusive are cross sectional elevations taken on the correspondingly numbered section lines in Fig. 1;

Fig. 11 is a side elevation of an eight-throw five-bearing crankshaft embodying my improvements;

Fig. 12 is an end view thereof looking in the direction of the arrow 12 in Fig. 11, and Figs. 13 to 24 inclusive are cross sectional elevations taken along the correspondingly numbered section lines in Fig. 11.

Referring particularly to Figs. 1 to 10, I have shown an eight-throw nine-bearing crankshaft having an end bearing 30, a counterbalanced cheek 31, a crank pin 32, a single cheek 33, a main bearing 34, a single cheek 35, a crank pin 36, a counterbalanced cheek 37, a main bearing 38, a counterbalanced cheek 39, a crank pin 40, a single cheek 41, a main bearing 42, a single cheek 43, a crank 44, a counterbalanced cheek 45 and a central main bearing 46.

The right hand half of the shaft is substantially identical with the left hand half above described and the cheeks and bearings are correspondingly numbered, with the exception of the end bearing 50 which is provided with the usual flange 51 for attachment to the driven mechanism.

By reference to the end and sectional views, it will be noted that the two pairs of crank pins 32 and 36 at the two ends of the shaft are in the same plane, while the two pairs of crank pins 40 and 44 in the middle portion of the shaft are in a second plane perpendicular to the first mentioned plane. Furthermore it will be noted that a separate counterweight is associated with each crank pin and that the end and middle counterweights are symmetrically disposed with respect to the prolongation of a line passing through the axis of the associated crank pin and the main axis of the crankshaft. These symmetrically disposed counterweights are clearly shown in Figs. 3 and 10.

It will also be seen that the two pairs of intermediate cheeks 37 and 39 have their associated counterweights offset at an angle of substantially 45° to the prolongation of a line joining the associated crank pin to the main axis of the crankshaft.

Reference to Fig. 2 will show that the combined counterweight mass of the cheeks 37 and 39 is opposed to the combined counterweight mass of the cheeks 31 and 45, and is positioned at such an angle that the crankshaft will be in static balance, as well as being accurately counterbalanced when rotated at comparatively high speeds. Each counterweight 31 or 45 is of such a mass and radius as to effectively counterbalance the crank pin and the cheeks associated therewith and is preferably designed to also take into account a portion of the connecting rod associated therewith. Each pair of counterweights 37 and 39 act together to counterbalance the resultant of the pins 36 and 40 and their associated parts preferably including portions of the associated connecting rods. All counterweights are forged integral with the shaft and detachment thereof is substantially impossible. A crankshaft thus constructed is found to be capable of rotation at high speed with very little vibration.

In Figs. 11 to 24 I have shown my invention applied to an eight-throw crankshaft having five main bearings.

The shaft has an end bearing 60 connected by a counterbalanced cheek 61 to a crank pin 62 and is further provided with a connecting cheek 63, crank pin 64, counterbalanced cheek 65, main bearing 66, counterbalanced cheek 67, crank pin 68, connecting cheek 69, crank pin 70, counterbalanced cheek 71, and main bearing 72. The right hand half of the shaft is a substantial duplicate of the parts already described and is similarly numbered, with exception of the end main bearing 74 provided with the usual flanged coupling member 75.

The end cheeks 61 and middle cheeks 71 are provided with counterweights symmetrically disposed with respect to the prolongation of a line drawn through the center of the associated crank pin and the center of the crankshaft. The cheeks 65 and 67 at each side of the intermediate shaft bearing 66 are provided with counterweights offset substantially 45° from the prolongation of a line drawn through the center of the associated crank pin and the axis of the shaft.

It will be noted that the counterweight of the cheek 65 is offset in one direction while the counterweight of the cheek 67 is offset in the opposite direction, bringing the counterweights in substantial axial alignment, as the crank pins 64 and 68 are in perpendicular planes. The combined effect of the counterweights 65 and 67 is to counterbalance the symmetrical counterweights on the cheeks 61 and 71, which are at 90° to each other as indicated in Fig. 12.

The shaft is thus in static balance and is also in running balance when the shaft is rotated even at relatively high speed. The construction and operation is substantially similar to the form already described. As the connecting cheeks 63 and 69 are symmetrically disposed with respect to the axis of the shaft, they do not materially change the conditions to be counterbalanced.

A crankshaft constructed as shown in Figs. 1 to 10 or as shown in Figs. 11 to 24 is found to be well adapted for the purposes designed and capable of rotation without substantial vibration at any reasonable speed.

Having thus described my invention and the advantages thereof, I do not wish to be limited to the details herein disclosed otherwise than as set forth in the claims, but what I claim is:—

1. An eight-throw crankshaft having eight crank pins positioned in two planes perpendicular to each other and having a single integral counterweight associated with each crank pin but positioned on the opposite side of the crankshaft axis therefrom, the two end counterweights and the two middle counterweights being centered substantially on a prolongation of the line joining the axis of the associated crank pin with the axis of the crankshaft, and the four counterweights associated with the four remaining crank pins being offset substantially 45° from the line joining the axis of the associated crank pin with the axis of the crankshaft and being substantially in axial alignment with each other, each end and middle counterweight being of a mass and radius effective to substantially counterbalance its associated crank pin and parts associated therewith, and each intermediate pair of counterweights acting together to counterbalance the resultant of the two intermediate crank pins and parts associated therewith.

2. An eight-throw nine-bearing crankshaft having eight crank pins positioned in two planes perpendicular to each other and having a single integral counterweight associated with each crank pin but positioned on the opposite side of the crankshaft axis therefrom, the two end counterweights and the two middle counterweights being centered substantially on a prolongation of the line joining the axis of the associated crank pin with the axis of the crankshaft, and the four counterweights associated with the four remaining crank pins being offset substantially 45° from the line joining the axis of the associated crank pin with the axis of the crankshaft and being substantially in axial alignment with each other, each end and middle counterweight being of a mass and radius effective to substantially counterbalance its associated crank pin and the parts associated therewith, and each intermediate pair of counterweights acting together to counterbalance the resultant of the two intermediate crank pins and parts associated therewith.

In testimony whereof I have hereunto affixed my signature.

JOHN A. OLDSON.